May 12, 1959   R. ALBER   2,885,912
METHOD AND APPARATUS FOR SHARPENING SAW BLADES
Filed Nov. 26, 1956   2 Sheets-Sheet 1

INVENTOR:
Rudolf Alber
BY: Michael S. Striker
Agt.

May 12, 1959  R. ALBER  2,885,912
METHOD AND APPARATUS FOR SHARPENING SAW BLADES
Filed Nov. 26, 1956  2 Sheets-Sheet 2

INVENTOR:
Rudolf Alber
BY: Michael S. Striker
Agt.

2,885,912
Patented May 12, 1959

2,885,912

METHOD AND APPARATUS FOR SHARPENING SAW BLADES

Rudolf Alber, Ebersbach (Fils), Baden-Wurttemberg, Germany

Application November 26, 1956, Serial No. 624,274

17 Claims. (Cl. 76—40)

The present invention relates to a method and apparatus for sharpening saw blades, particularly the annular saw blades of band saws. More particularly, the present invention relates to a method and apparatus for sharpening a saw blade by means of a grinding tool.

According to the known art, saw blades are sharpened by moving a grinding tool over the saw teeth at a constant relative speed between the saw blade and the grinding tool. According to a known arrangement, the saw blade is shifted by a shifting member engaging a saw tooth to move at a constant speed a distance corresponding to a tooth pitch. At the same time, the grinding tool is moved in transverse direction with respect to the saw blade so that the desired shape of the rear edge of the saw tooth is obtained. When the grinding tool has passed beyond the outermost point of the respective saw tooth, the shifting member releases the respective saw tooth, and the movement of the saw blade is interrupted. At this time the grinding tool is moved at a constant speed in transverse direction with respect to the saw blade, and grinds the front face of the respective saw tooth. When the grinding tool has arrived at the recessed edge portion located between two adjacent saw teeth, the shifting member shifts the saw blade for the next distance corresponding to a tooth pitch. During such shifting movement of the saw blade, the rear edge of the respective saw tooth is ground.

However, the known method and apparatus for grinding saw blades have certain disadvantages. It has been found that the material of the saw blade is heated during the grinding operation to a greater extent at the inner portions of the front and rear edges of the saw teeth, and at the recessed edge portions between adjacent saw teeth. The reason therefor is that the disk-shaped grinding tool is in engagement with a greater part of the saw tooth edge when in an inner position than when in an outer position grinding the saw tooth edges adjacent the outermost points of the saw teeth.

Consequently, the inner recessed edge portions of the saw tooth edge of the sharpened saw blade are heated to such extent that the material of the saw blade becomes brittle and hard, whereas the outermost points of the saw teeth remain resilient and soft. When the saw blade is bent, as this is the case when annular saw blades are used in a band saw, the saw blade is mainly bent at the points at which its width is reduced, that is at the points between adjacent saw teeth. As explained above, such recessed edge portions of the saw blade are brittle after a grinding operation according to the known art, and will crack when bent during use in a band saw.

In accordance with the present invention, it is recognized that the well known cracks in the recessed edge portions of saw blades are caused by excessive heating of the respective portions during the known grinding operations.

If such cracks would not develop in ground saw blades, it would be possible to grind the saw blades more often, and thereby to extend the use of saw blades almost indefinitely. The economic advantages of such an improvement will be appreciated.

In the event that an attempt is made to prevent excessive heating of the recessed edge portions of the saw tooth edge by increasing the speed of the grinding operation, sufficient grinding of the outer edge portions of the saw teeth is no longer assured. When the machines of the known art are properly adjusted to the correct speed at which the outer portions of the rear edges and of the front edges of the saw teeth is assured, the inner portions of the front and rear edges of the saw teeth, and the recessed edge portions between adjacent saw teeth are heated to such extent that the material becomes brittle. Almost all saw blades which have been sharpened in accordance with the known art and reused in band saws, show the cracks between adjacent saw teeth.

It is one object of the present invention to overcome the disadvantages of the known methods and apparatus for grinding saw blades, and to provide a method and apparatus for grinding saw blades in such a manner that the saw blades can be ground repeatedly, and used after each grinding operation without deteriorating.

It is another object of the present invention to provide a method and apparatus for sharpening saw blades in such a manner that the sharpened saw blades may be repeatedly reused without any crack formation.

It is another object of the present invention to provide a method and apparatus for sharpening saw blades in such a manner that the formation of brittle portions of the saw blade is prevented during grinding.

It is another object of the present invention to provide a method and apparatus for sharpening a saw blade assuring proper grinding of the outer edge portions of the saw teeth, while avoiding excessive heating of the inner portions of the saw teeth and of the recessed edge portions between adjacent saw teeth.

It is another object of the present invention to provide a method and apparatus for grinding saw blades by which the span of life of the saw blade is considerably extended as compared with known grinding methods.

With these objects in view, the present invention mainly consists in a method of sharpening a saw blade which includes the steps of moving a tool and the saw blade relative to each other while the tool consecutively engages the saw teeth, and increasing the relative speed between the tool and the saw blade before the tool engages the inner portions of the saw teeth and the recessed edge portions intermediate adjacent saw teeth. Thereby, excessive heating of the inner portions of the saw teeth and of the recessed edge portions is prevented so that no hard and brittle spots are formed in the material of the saw blade.

According to a preferred method of the present invention, the saw blade is moved in longitudinal direction thereof, and the grinding tool is moved in a direction transverse thereto. Consequently, the grinding tool moves at a lower speed while engaging the outer portions of the front edges of the saw teeth, and at a higher speed while engaging the inner portions of the front edges of the saw teeth, while the saw blade moves at a lower speed while the grinding tool engages the outer portions of the rear edges of the saw teeth, and moves at a higher speed while the grinding tool engages the inner portions of the rear edges of the saw teeth and the recessed edge portions intermediate adjacent saw teeth.

An apparatus according to the present invention mainly comprises a grinding tool; means for supporting the grinding tool in the position engaging the saw tooth edge of a saw blade; means for moving the tool and the saw blade relative to each other so that the grinding tool consecutively engages all saw teeth; and means for increasing the relative speed between the grinding tool and the saw tooth edge before the grinding tool engages the inner portions of the saw tooth edge and the recessed edge portions located intermediate adjacent saw teeth.

The operating means for moving the grinding tool and the saw blade, are preferably controlled by cam means. Such cam means are provided with annular cam tracks whose gradients vary so that the controlled elements move at different speeds in accordance with the cam track portions operative at the respective time. While the grinding tool engages the outer portions of the saw teeth, the cam track portions having a lower gradient are effective, whereas the cam track portions having a higher gradient are operative when the grinding tool engages the inner recessed portions of the saw tooth edge. A higher gradient of the cam track corresponds to a more rapid relative movement, and a lower gradient corresponds to a slower relative movement between the grinding tool and the saw blade.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
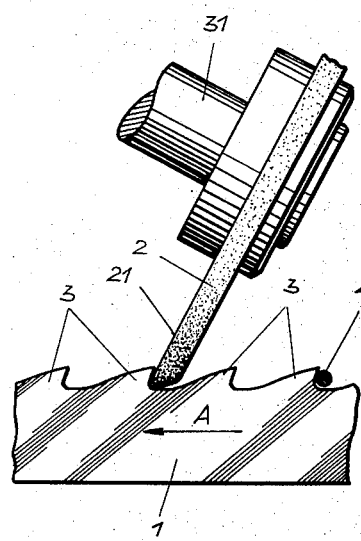
Fig. 1 is a fragmentary side view illustrating a grinding tool during the grinding of a saw blade.
Figure 2:
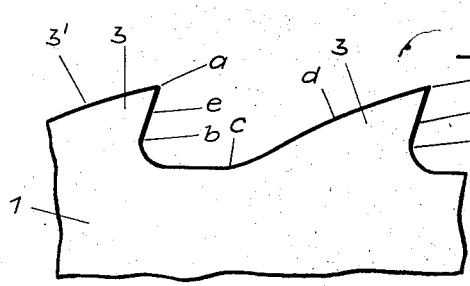
Fig. 2 is a fragmentary side view of a portion of a saw blade of the type used in band saws.
Figure 3:
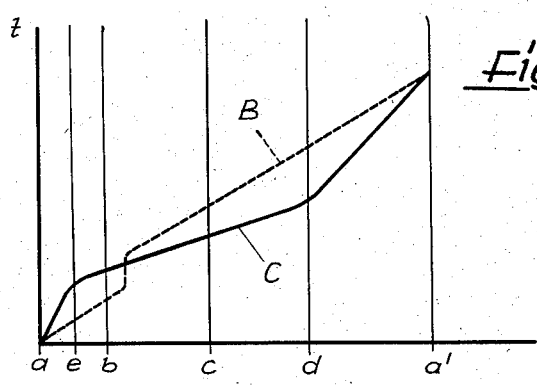
Fig. 3 is a diagram illustrating the operational conditions prevailing in constructions of the known art and in the present invention.

Referring now to the drawings, and more particularly to Figs. 1–3 which illustrate the principle of the operation of the grinding method according to the present invention, in the arrangement shown in Fig. 1, the saw blade 1 is sharpened by the grinding tool 2 which passes over the saw tooth edge formed by the saw teeth 3 of the saw blade 1. It will be understood that a relative movement between the grinding tool 2 and the saw tooth edge of the saw blade 1 may be produced in various ways. For example, the grinding tool 2 may be fixed, and the saw blade could be moved in longitudinal and transverse direction thereof. It will be also possible to hold the saw blade stationary, and to produce a movement of the grinding tool 2 along the saw tooth edge of the saw blade. However, in the preferred embodiment of the present invention, the saw blade 1 is moved in longitudinal direction thereof, and the grinding tool is moved in a transverse direction.

The saw blade 1 is shifted by means of a shifting member 4 in the direction of the arrow A for one tooth pitch, that is the distance between two adjacent teeth 3. The shifting member 4 is actuated by operating means, not shown in Fig. 1, and engages either an already ground tooth or a tooth which has not yet been ground. At the same time, the grinding tool is moved in outward direction by operating means, not illustrated in Fig. 1. Consequently, the grinding tool 2 moves along the rear edge 3' of the respective saw tooth, and sharpens such rear edge. When the grinding tool 2, and more particularly the rear face 21 thereof, has passed the outermost point $a$ of the respective saw tooth, the shifting member 4 is disengaged from the respective associated saw tooth 3. Consequently, the saw blade 1 remains at a standstill while the grinding tool sharpens the front edge of the respective saw tooth 3 between the points $a$ and $b$. The grinding tool moves in such direction that a steep front edge is ground, and the rear face 21 of the grinding tool defines an angle of 5°–10° with the front edge of the tooth 3.

When the grinding tool 2 has reached a position in which the recessed edge portion located between points $b$ and $c$ is ground, the shifting member 4 has engaged the next following saw tooth 3 and shifts the saw blade 1 for a pitch distance. During such shifting of the saw blade, the grinding tool passes from point $b$ to point $c$, point $d$ and point $a'$ which is the outermost point of the next following saw tooth. During such movement of the saw blade, the grinding tool is moved in outward direction while engaging the rear edge of the saw tooth located between points $c$ and $a'$. Thereupon the shifting member 4 releases the saw blade, and the grinding tool is moved inwardly as described above for grinding the front edge of the next following saw tooth.

Fig. 3 illustrates the grinding operation according to the known art by the graph B, and the grinding operation according to the present invention by the graph C. In Fig. 3, the abscissas indicate distances along the saw tooth edge of the saw blade, and the ordinates indicate the time. The abscissas $ab$ correspond to the front edge of the tooth 3 shown in Fig. 2 which includes an outer front edge portion $a$—$e$, and an inner front edge portion $e$—$b$. The distance $b$—$c$ in the diagram of Fig. 3 corresponds to the recessed edge portion $b$—$c$ shown in Fig. 2 which includes the fillet. The distance $c$—$d$ corresponds to the inner portions $c$—$d$ of the rear edge of the tooth 3, and the distance $d$—$a'$ corresponds to the outer portion $d$—$a'$ of the rear face of the saw tooth 3.

In the grinding operation according to the known art as illustrated by the graph B in Fig. 3, the grinding tool is moved at constant speed along the front edge $a$—$b$. When the grinding tool has reached point $b$, it stays there for a moment until the saw blade 1 is shifted by the shifting member 4 whereupon the grinding tool 2 moves along the recessed edge $b$—$c$, and along the rear edge $c$—$a'$ of the next following saw tooth, such movement taking place at the same constant speed.

In the grinding operation in accordance with the present invention as illustrated by the graph C in Fig. 3, the grinding tool 2 moves along the outer portion $a$—$e$ of the front edge of the saw tooth at a considerably lower speed so that even at comparatively high operational speeds, a perfect grinding of the cutting edge of the saw tooth is assured. When the grinding tool 2 arrives at the point $e$, it is accelerated to move rapidly along the inner portion $e$—$b$ of the front edge of the saw tooth toward the fillet. The motion of the saw blade 1 in longitudinal direction starts at the point $e$, and takes place at high speeds, so that the grinding tool 2 passes along the recessed edge portion $b$—$c$ at great speed, and then moves at the same speed along the inner portion $c$—$d$ of the rear edge of the next following saw tooth. Due to the fact that the relative speed between the saw blade edge and the grinding tool is higher between the points $e$ and $d$ than between the points $a$ and $e$, and $d$ and $a'$, respectively, considerably less heat is developed in the recessed portions of the saw tooth edge than is the case in the arrangement of the prior art, assuming that the grinding of each tooth is completed in the same time as indicated in Fig. 3. The time saved by the more rapid motion along the inner portions of the saw teeth is used for moving the grinding tool at a lower speed along the outer portions of the saw teeth whereby a more accurate grinding of the outer cutting portions is obtained.

Due to the fact that the inner edge portions are heated to a lesser extent, the material of the saw blade remains soft and resilient, and the danger of formation of brittle and hard portions is eliminated so that cracks will not occur when the saw blade is bent when used in a band saw. Due to the fact that the outer portions of the saw teeth are ground at a lower relative speed, such outer portions are not only more exactly ground, but also heated so that certain types of steel are hardened in the air which is advantageous for the cutting portions of the saw teeth. However, the relative speed can be so adjusted in accordance with the present invention that no portion of the saw tooth edge is hardened.

Figure 4:
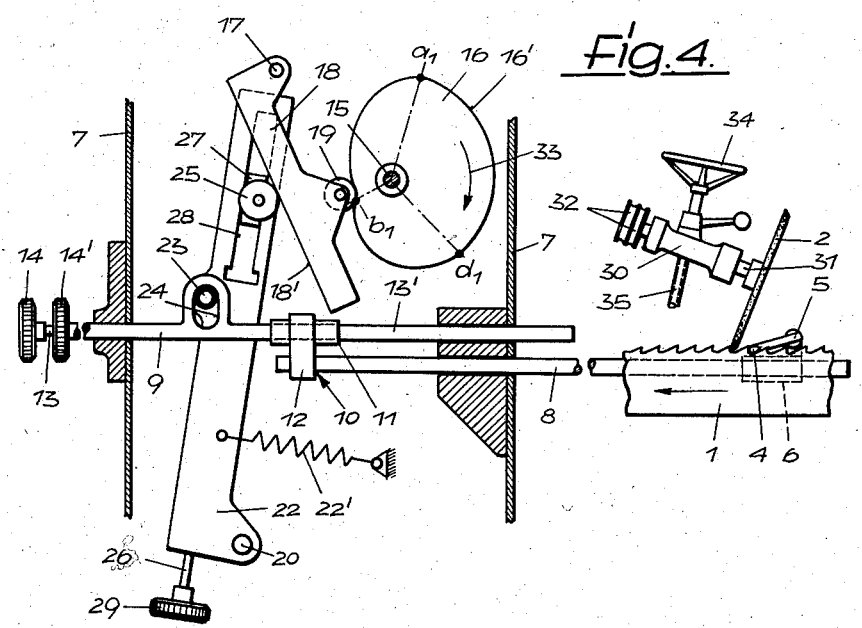
Fig. 4 is a fragmentary side view, partly in section, illustrating a preferred embodiment of the present invention.
Figure 5:
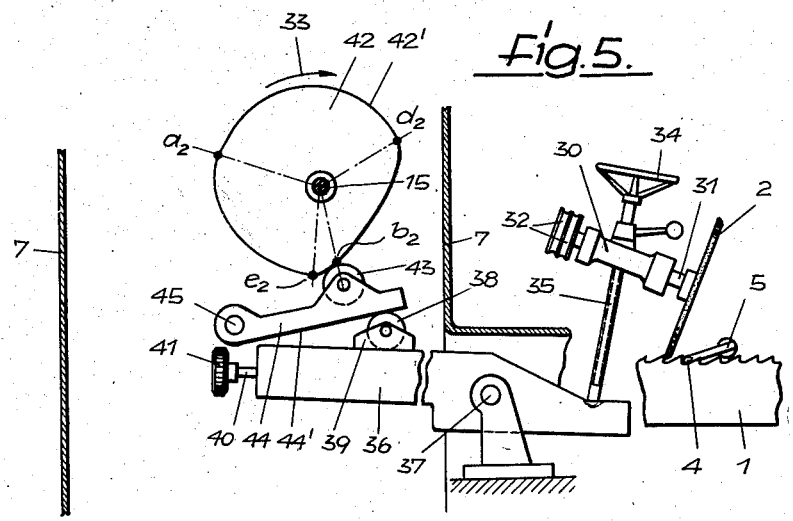
Fig. 5 is a fragmentary side view, partly in section, of the embodiment illustrated in Fig. 4 taken in a plane parallel to the plane of section of Fig. 4, with certain elements shown in Fig. 4 omitted in Fig. 5 for the sake of clarity.

Figs. 4 and 5 illustrate an embodiment of the present invention, Fig. 4 showing the arrangement for shifting the saw blade in longitudinal direction thereof, and Fig. 5 showing the arrangement for moving the grinding tool 2 in a transverse direction. The control cam means 16 and 42, which will be described in great detail hereinafter, are mounted on a common drive shaft 15, and certain elements of Fig. 4 are omitted in Fig. 5 for the sake of clarity.

Referring now to Fig. 4, the shifting member 4 is pivotally mounted on a shaft 5, and includes a transverse pin engaging the recess between two adjacent saw teeth. The shaft 5 is mounted on a carrier 6 which is fixedly connected to an operating rod 8. Operating rod 8 is shiftably mounted in the frame of the machine, generally indicated by the reference numeral 7, so that shifting of the rod 8 will result in shifting of the shifting member 4, and in displacement of the saw blade for one tooth pitch.

Another operating rod 9 is mounted in the frame 7 shiftable in longitudinal direction, and is connected to rod 8 by adjustable means 10. The rod 9 is tubular, and a reduced section 13 of a rod 13' passes through the tubular rod 9 and is provided at the free end thereof with a knob 14 by which rod 13, 13' can be turned. The rod section 13 is provided with a thread 11 engaging an inner thread of an arm 12 which is connected to rod 8. A counter nut 14' is provided for locking the knob 14 in an adjusted position. By turning of knob 14, the relative position of the two operating rods 8 and 9 can be adjusted, whereby the position of the carrier 6 and of the shifting member 4 is also adjusted. Thereby, the relative position between the grinding tool 2 and the front edges of the saw teeth can be adjusted and the depth of the ground off layer controlled.

The operating means for controlling the shifting of the saw blade further include a pair of levers 22 and 18. Lever 22 is pivotally mounted on a pivot pin 20, and is connected by a pivot pin 23 to rod 9, since the pivot pin 23 projects into an elongated slot 24 provided in a projection on rod 9. A slide member 27 is slidably mounted in an elongated slot 28 of lever 22, and is operated by a spindle 26 engaging a threaded hole in the slide member 27. Spindle 26 is mounted in lever 22 non-shiftable in axial direction, so that turning of the knob 29 results in movement of the slide member 27 along the slot 28. Slide member 27 carries a turnable roller 25 which engages an edge 18' of a lever 18 which is pivotally mounted for turning movement about the pin 17. A spring 22' urges lever 22 and the linkage 9, 13, 13', 12 and 8 to the right as viewed in Fig. 4 so that the roller 25 is in continuous engagement with the lever 18, and urges the same to the right in Fig. 4. A control cam means 16 is mounted on a shaft 15, and has an annular cam track 16' engaged by a cam follower roller means 19 which is turnably mounted on lever 18. Due to the fact that spring 22' urges the operating levers 18 and 22 to the right in Fig. 4, the cam follower roller 19 is in continuous engagement with the cam track 16' of the control cam means 16. The grinding tool 2 is shown to be a rotary disk mounted on a shaft 31 which carries at its free end V-belt pulleys 32 from which shaft 31 and grinding tool 2 are driven in a known manner. Shaft 31 is turnably mounted in a member 30 which is turnable about a shaft which is parallel to shaft 31 so that the axis of shaft 31 can be moved along a cylindrical surface in whose axis the above mentioned shaft is located. This arrangement is known, and consequently the above-mentioned shaft is not shown in Fig. 4. It will be understood, that the grinding disk 2 moves in its own plane during such movement of shaft 31.

The member 30 is connected to a nut means through which the spindle 35 passes. Spindle 35 can be turned by hand wheel 34, and engages a lever 36 which is mounted for pivotal movement about a pivot 37, as best seen in Fig. 5. By turning of hand wheel 34 and spindle 35, the member 30 is forced to travel along the spindle 35 whereby the relative position between the lever 36 and the grinding tool is adjusted.

Lever 36 is provided with a suitable guide means extending in longitudinal direction thereof, and a slide member 39 is mounted in such guide means and is provided with a threaded hole, not shown in Fig. 5, engaged by the threaded spindle 40. A knob 41 is fixed to spindle 40 so that by turning of knob 41, the slide member 39 is shifted along the length of lever 36, whereby the position of a roller 38 which is turnably mounted on slide member 39, can be adjusted with respect to another lever 44 which is pivotally mounted for pivotal movement about a pin 45. Lever 44 has a longitudinal edge 44' engaged by the roller 38. A cam follower roller 43 is turnably mounted on lever 44 and engages the cam track 42' on a second control cam means 42 which is mounted on the same shaft 15 as the control cam means 16. Consequently both control cams turn in the direction of the arrow 33 during operation of the machine. It will be understood that turning of the control cam means 42 will control the operating means 44, 36, 35, 30 to shift the grinding tool 2 in a direction transverse to the longitudinal movement of the saw blade 1 obtained by the operating means shown in Fig. 4 and by the control cam means 16.

In the arrangement shown in Fig. 5, the weight of the grinding tool and of the linkage 35, 30 is sufficient to pivot lever 36 in clockwise direction whereby the cam follower means 43 is urged against the annular cam track 42'.

Each of the annular cam tracks 16' and 42' has a plurality of cam track portions which respectively correspond to the edge portions of the saw tooth edge of the saw blade as described with reference to Figs. 2 and 3.

The annular cam track 16' of the control cam 16 which controls the longitudinal shifting movement of the saw blade is divided into a plurality of cam track portions. The cam track portion $a_1$—$b_1$ is effective while the grinding tool 2 engages the front edge $a$—$b$ of a saw tooth. The cam track portion $b_1$—$d_1$ is effective while the grinding tool is in engagement with the portion $b$—$d$ of the saw blade, and the cam track portion $d_1$—$a_1$ is effective while the grinding tool is in engagement with the outer portion $d$—$a'$ of the rear edge of the saw tooth 3.

The cam track portion $a_2$—$e_2$ of the annular cam track 42' is effective while the grinding tool is in engagement with the outer portion $a$—$e$ of the front edge of a saw tooth 3. The cam track portion $e_2$—$b_2$ is effective while the grinding tool is in engagement with the inner portion $e$—$b$ of the front edge of the saw tooth. The cam track portion $b_2$—$d_2$ is effective while the grinding tool is in engagement with the portion $b$—$d$ of the saw tooth edge, and the cam track portion $d_2$—$a_2$ is effective while the grinding tool is in engagement with the outer portion $d$—$a'$ of the rear edge of the saw tooth 3. It will be noted that the radius of the control cam 16 at the point $b_1$ is substantially smaller than at the point $d_1$. Consequently the saw blade is rapidly advanced in the direction of the arrow in Fig. 4 while the cam follower roller 19 moves over portion $b_1$—$d_1$ of the cam track 16′. As previously explained, this corresponds to a rapid movement of the recessed edge portion $b$—$c$ and of the inner portion $c$—$d$ of the rear edge of the saw tooth relative to the grinding tool 2, for preventing excessive heating of such inner portions of the saw tooth edge of the saw blade. The advance of the saw blade is slower while the cam track portion $d_1$—$a_1$ is effective as is desired for a perfect grinding of the outer portion $d$—$a'$ of the rear edge of the saw tooth. The gradient of the cam track portion $b_1$—$d_1$ is higher than the gradient of the cam track portion $d_1$—$a_1$. While the cam follower roller 19 passes over the cam track portion $a_1$—$b_1$, the shifting member 4 moves in a direction opposite to the direction of the arrow in Fig. 4, and slides over the saw teeth in a manner similar to a ratchet pawl.

The cam track portion $a_2$—$e_2$ of the cam track 42′ controls the grinding tool during engagement with the outer portion $a$—$e$ of the front edge of the saw tooth. A slow movement of the grinding tool is desired in accordance with the present invention, and consequently the difference between the radii at $a_2$ and at $e_2$ is small, and the gradient of the cam track is small. During movement of the grinding tool along the inner portion $e$—$b$ of the front edge of the saw tooth, a rapid movement is desired, and consequently the gradient of the cam track portion $e_2$—$b_2$ is high. During grinding of the recessed edge portion $b$—$c$, the control cam means 16 is mainly effective to produce the rapid relative movement between the grinding tool and the saw blade. However, the first part of the cam track portion $b_2$—$d_2$ has a high gradient since a rapid movement of the grinding tool is required along the fillet adjacent the point $b$ of the saw blade. The cam track portion $d_2$—$a_2$ cooperates with the cam track portion $d_1$—$a_1$ to produce the desired shape of the outer portion of the rear edge of the saw tooth.

Due to the fact that the control cam means 16 and 42 are arranged on the same shaft 15, the operation of the grinding tool and of the saw blade are always perfectly synchronized to obtain a predetermined shape of the saw tooth determined by the design of the annular cam track 16′ and 42′. By adjustment of the positions of the rollers 25 and 38, it is possible to adapt the machine to the grinding of saw teeth having different tooth pitch and tooth depth. The construction of the operating means illustrated in the drawings is particularly advantageous because it results in a minimum distortion of the relative movement between the grinding tool and the saw blade when the adjustment of rollers 25 and 38 is carried out. Thereby it is assured that the desired variation of the relative speed between the grinding tool and the saw blade during the grinding of the various portions of the saw tooth edge is obtained regardless of the size of the ground saw teeth.

The cam tracks 16′ and 42′ are designed in such manner that the innermost point of the recessed edge portion $b$—$c$ is located on a perpendicular line from point $a$ to the recessed edge portion, or to the right of such perpendicular line as viewed in Fig. 2. By shifting of the innermost recessed point of the recessed edge portion $b$—$c$ toward the rear edge of the adjacent saw tooth, the tendency to crack formation at the narrowest point of the saw blade is further counteracted.

It will be understood that each of the elements described above, or two or more together, may also find a useful application in other types of methods for sharpening saw blades differing from the types described above.

While the invention has been illustrated and described as embodied in a method and apparatus for sharpening a saw blade at varying relative speed between the saw tooth edge and the grinding tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of sharpening a saw blade having a set of saw teeth, in combination, the step of moving a tool and each saw tooth, while in engagement with each other, relative to each other at a lower relative speed than the mean relative speed while the tool is in engagement with an outer portion of the respective saw tooth, and at a higher speed than the mean relative speed while the tool is in engagement with an inner portion of the respective saw tooth whereby excessive heating of said inner portions of the respective saw tooth is prevented.

2. In a method of sharpening a saw blade having a set of saw teeth, in combination, the step of moving a tool and each saw tooth, while in engagement with each other, relative to each other at a lower relative speed than the mean relative speed while the tool is in engagement with an outer portion of the respective saw tooth, and at a higher speed than the mean relative speed while the tool is in engagement with an inner portion of the respective saw tooth and with recessed edge portions between adjacent saw teeth whereby excessive heating of said inner portions of the respective saw tooth and of the recessed edge portions between adjacent saw teeth is prevented.

3. A method of sharpening a saw blade having a set of saw teeth, each saw tooth having a steep front edge and a gradually inclined rear edge, the front edge of each saw tooth being connected to the rear edge of the adjacent saw tooth by the recessed edge portion, the method comprising the steps of moving a grinding tool at a lower speed than its mean speed relative to said front edges while said grinding tool engages outer portions of said front edges, and at a higher speed than its mean speed while said grinding tool engages inner portions of said front edges; and moving said saw blade relative to said grinding tool at a lower speed than its mean speed while said grinding tool engages the outer portion of each rear edge, and at a higher speed than its mean speed while said grinding tool engages the inner portion of each rear edge and said recessed edge portions whereby excessive heating of said inner portions and of said recessed edge portions is prevented.

4. Apparatus for sharpening a saw blade having a saw tooth edge including a set of saw teeth, each saw tooth having a steep front edge extending transverse to the saw blade, and a gradually inclined rear edge, the apparatus comprising, in combination, a grinding tool; first operating means for moving the saw blade in substantially longitudinal direction thereof relative to said grinding tool; second operating means for moving said grinding tool in a direction transverse to said longitudinal direction of said saw blade; supporting means for supporting said grinding tool in a position engaging said saw tooth edge for movement in said transverse direction; and control means connected to said first operating means for controlling the same to move the saw blade at a lower speed than its mean speed while said grinding tool engages outer portions of said rear edges, and at a higher speed than its mean speed while said grinding tool engages inner portions of said rear edges.

5. Apparatus for sharpening a saw blade having a saw tooth edge including a set of saw teeth, each saw tooth having a steep front edge extending transverse to the saw blade, and a gradually inclined rear edge, the apparatus comprising, in combination, a grinding tool; first operating means for moving the saw blade in substantially longitudial direction thereof relative to said grinding tool; second operating means for moving said grinding tool in a direction transverse to said longitudinal direction of said saw blade; supporting means for supporting said grinding tool in a position engaging said saw tooth edge for movement in said transverse direction; and control means connected to said second operating means for controlling the same to move the grinding tool at a lower speed than its mean speed while said grinding tool engages outer portions of said front edges, and at a higher speed than its mean speed while said grinding tool engages inner portions of said front edges.

6. Apparatus for sharpening a saw blade having a saw tooth edge including a set of saw teeth, each saw tooth having a steep front edge extending transverse to the saw blade, and a gradually inclined rear edge, the apparatus comprising, in combination, a grinding tool; first operating means for moving the saw blade in substantially longitudinal direction thereof relative to said grinding tool; second operating means for moving said grinding tool in a direction transverse to said longitudial direction of said saw blade; supporting means for supporting said grinding tool in a position engaging said saw tooth edge for movement in said transverse direction; first control means connected to said first operating means for controlling the same to move the saw blade at a lower speed than its mean speed while said grinding tool engages outer portions of said rear edges, and at a higher speed than its mean speed while said grinding tool engages inner portions of said rear edges; and second control means connected to said second operating means for controlling the same to move said grinding tool at a lower speed than its mean speed while said grinding tool engages the outer portions of said front edges, and at a higher speed than its mean speed while said grinding tool engages the inner portions of said front edges.

7. Apparatus for sharpening a saw blade having a saw tooth edge including a set of saw teeth, each saw tooth having a steep front edge extending transverse to the saw blade, and a gradually inclined rear edge, the saw tooth edge having recessed edge portions between the front edges and the rear edges of adjacent saw teeth, the apparatus comprising, in combination, a grinding tool; first operating means for moving the saw blade in substantially longitudinal direction thereof relative to said grinding tool; second operating means for moving said grinding tool in a direction transverse to said longitudinal direction of said saw blade; supporting means for supporting said grinding tool in a position engaging said saw tooth edge for movement in said transverse direction; first control means connected to said first operating means for controlling the same to move the saw blade at a lower speed than its mean speed while said grinding tool engages outer portions of said rear edges, and at a higher speed than its mean speed while said grinding tool engages inner portions of said rear edges and said recessed edge portions; and second control means connected to said second operating means for controlling the same to move said grinding tool at a lower speed than its mean speed while said grinding tool engages the outer portions of said front edges, and at a higher speed than its mean speed while said grinding tool engages the inner portions of said front edges.

8. Apparatus for sharpening a saw blade having a saw tooth edge including a set of saw teeth, each saw tooth having a steep front edge extending transverse to the saw blade, and a gradually inclined rear edge, the saw tooth edge having recessed edge portions between the front edges and the rear edges of adjacent saw teeth, the apparatus comprising, in combination, a grinding tool; first operating means for moving the saw blade in substantially longitudinal direction thereof relative to said grinding tool; second operating means for moving said grinding tool in a direction transverse to said longitudinal direction of said saw blades; supporting means for supporting said grinding tool in a position engaging said saw tooth edge for movement in said transverse direction; first control cam means connected to said first operating means for controlling the same to move the saw blade at a lower speed than its mean speed while said grinding tool engages outer portions of said rear edges, and at a higher speed than its mean speed while said grinding tool engages inner portions of said rear edges and said recessed edge portions; and second control cam means connected to said second operating means for controlling the same to move said grinding tool at a lower speed than its mean speed while said grinding tool engages the outer portions of said front edges, and at a higher speed than its mean speed while said grinding tool engages the inner portions of said front edges.

9. Apparatus for sharpening a saw blade having a saw tooth edge including a set of saw teeth, each saw tooth having a steep front edge extending transverse to the saw blade, and a gradually inclined rear edge, the apparatus comprising, in combination, a grinding tool; first operating means for moving the saw blade in substantially longitudinal direction thereof relative to said grinding tool and including a first cam follower means; second operating means for moving said grinding tool in a direction transverse to said longitudinal direction of said saw blade, and including a second cam follower means; supporting means for supporting said grinding tool for movement in said transverse direction in a position engaging said saw tooth edge; a first control cam means having a first annular cam track engaged by said first cam follower means for controlling said first operating means, said first annular cam track including a cam track portion having a low gradient for actuating said first operating means to move the saw blade at a lower speed than its mean speed while said grinding tool engages outer portions of said rear edges, said first annular cam track including a cam track portion having a high gradient for actuating said first operating means to move the saw blade at a higher speed than its mean speed while said grinding tool engages inner portions of said rear edges; and a second control cam means having a second annular cam track engaged by said second cam follower means for controlling said second operating means, said second annular cam track including a cam track portion having a low gradient for actuating said second operating means to move said grinding tool at a lower speed than its mean speed while said grinding tool engages outer portions of said front edges, said second annular cam track including a cam track portion having a high gradient for actuating said second operating means to move said grinding tool at a higher speed than its mean speed while said grinding tool engages the inner portions of said front edges.

10. Apparatus for sharpening a saw blade having a saw tooth edge including a set of saw teeth, each saw tooth having a steep front edge extending transverse to the saw blade, and a gradually inclined rear edge, the saw tooth edge having recessed edge portions located between the front edges and the rear edges of adjacent saw teeth and extending substantially in the longitudinal direction of the saw blade, the apparatus comprising, in combination, a grinding tool; first operating means for moving the saw blade in substantially longitudinal direction thereof relative to said grinding tool and including a first cam follower means; second operating means for moving said grinding tool in a direction transverse to said longitudinal direction of said saw blade, and including a second cam follower means; supporting means for supporting said grinding tool for movement in said transverse direction in a position engaging said saw tooth edge; a first control cam means having a first annular cam track engaged by said first cam follower means for controlling said first operating means, said first annular cam track including a cam track portion having a low gradient for actuating said first operating means to move the saw blade at a lower speed than its mean speed while said grinding tool engages outer portions of said rear edges, said first annular cam track including a cam track portion having a high gradient for actuating said first operating means to move the saw blade at a higher speed than its mean speed while said grinding tool engages inner portions of said rear edges and said recessed edge portions between the front edges and the rear edges of adjacent saw teeth; and a second control cam means having a second annular cam track engaged by said second cam follower means for controlling said second operating means, said second annular cam track including a cam track portion having a low gradient for actuating said second operating means to move said grinding tool at a lower speed than its mean speed while said grinding tool engages the outer portions of said front edges, said second annular cam track including a cam track portion having a high gradient for actuating said second operating means to move said grinding tool at a higher speed than its mean speed while said grinding tool engages the inner portions of said front edges.

11. Apparatus for sharpening a saw blade having a saw tooth edge including a set of saw teeth, each saw tooth having a steep front edge extending transverse to the saw blade, and a gradually inclined rear edge, the saw tooth edge having recessed edge portions located between the front edges and the rear edges of adjacent saw teeth and extending substantially in the longitudinal direction of the saw blade, the apparatus comprising, in combination, a grinding tool; operating means for moving the saw blade in substantially longitudinal direction thereof relative to said grinding tool and including a cam follower means; supporting means for supporting said grinding tool for movement in said transverse direction in a position engaging said saw tooth edge; a control cam means having an annular cam track engaged by said cam follower means for controlling said operating means, said annular cam track including a cam track portion having a low gradient for actuating said operating means to move the saw blade at a lower speed than its mean speed while said grinding tool engages outer portions of said rear edges, said annular cam track including a cam track portion having a high gradient for actuating said operating means to move the saw blade at a higher speed than its mean speed while said grinding tool engages inner portions of said rear edges and said recessed edge portions between the front edges and the rear edges of adjacent saw teeth.

12. Apparatus for sharpening a saw blade having a saw tooth edge including a set of saw teeth, each saw tooth having a steep front edge extending transverse to the saw blade, and a gradually inclined rear edge, the apparatus comprising, in combination, a grinding tool; operating means for moving said grinding tool in a direction transverse to said longitudinal direction of said saw blade, and including a cam follower means; supporting means for supporting said grinding tool for movement in said transverse direction in a position engaging said saw tooth edge; and a control cam means having an annular cam track engaged by said cam follower means for controlling said operating means, said annular cam track including a cam track portion having a low gradient for actuating said operating means to move said grinding tool at a lower speed than its mean speed while said grinding tool engages outer portions of said front edges, said annular cam track including a cam track portion having a high gradient for actuating said operating means to move said grinding tool at a higher speed than its mean speed while said grinding tool engages inner portions of said front edges.

13. An apparatus as set forth in claim 10 wherein said first and second cam tracks have such a shape that the outermost point of the front edge of each saw tooth is located forwardly of the inner portion of the front edge and of the innermost point of the associated recessed edge portion.

14. Apparatus for sharpening a saw blade having a saw tooth edge including a set of saw teeth, each saw tooth having a steep front edge extending transverse to the saw blade, and a gradually inclined rear edge, the saw tooth edge having recessed edge portions located between the front edges and the rear edges of adjacent saw teeth and extending substantially in the longitudinal direction of the saw blade, the apparatus comprising, in combination, a grinding tool; first operating lever means for moving the saw blade in substantially longitudinal direction thereof relative to said grinding tool and including a first cam follower means; second operating lever means for moving said grinding tool in a direction transverse to said longitudinal direction of said saw blade, and including a second cam follower means; supporting means for supporting said grinding tool for movement in said transverse direction in a position engaging said saw tooth edge; a first control cam means having a first annular cam track engaged by said first cam follower means for controlling said first operating means, said first annular cam track including a cam track portion having a low gradient for actuating said first operating means to move the saw blade at a lower speed while said grinding tool engages outer portions of said rear edges, said first annular cam track including a cam track portion having a high gradient for actuating said first operating means to move the saw blade at a higher speed than its mean speed while said grinding tool engages inner portions of said rear edges; a second control cam means having a second annular cam track engaged by said second cam follower means for controlling said second operating means, said second annular cam track including a cam track portion having a low gradient for actuating said second operating means to move said grinding tool at a lower speed than its mean speed while said grinding tool engages the outer portions of said front edges, said second annular cam track including a cam track portion having a high gradient for actuating said second operating means to move said grinding tool at a higher speed than its mean speed while said grinding tool engages the inner portions of said front edges; and a driven shaft supporting said first and second control cam means.

15. An apparatus as set forth in claim 10 wherein said first operating means includes a first pivoted lever; a slide movably mounted on said first lever for movement along the same; a roller mounted on said slide; a second pivoted lever having a longitudinal edge engaged by said roller, said second lever supporting said first cam follower means; a shifting member for engaging the saw teeth of the saw blade for moving the saw blade; and adjustable linkage means interconnecting said first lever and said shifting member, and being pivotally connected to said first lever.

16. An apparatus as set forth in claim 10 wherein said second operating means includes a first pivoted lever means; a slide movably mounted on said first lever means for movement along the same; a roller means mounted on said slide; a second pivoted lever means having a longitudinal edge engaged by said roller means, said second lever means supporting said second cam follower means; and a linkage connecting said first lever means with said supporting means for supporting said grinding tool.

17. An apparatus as set forth in claim 10 including a driven shaft supporting said first and second control cam means; and wherein said first operating means includes a first pivoted lever; a slide movably mounted on said first lever for movement along the same; a roller mounted on said slide; a second pivoted lever having a longitudinal edge engaged by said roller, said second lever supporting said first cam follower means; a shifting member for engaging the saw teeth of the saw blade for moving the saw blade; adjustable linkage means interconnecting said first lever and said shifting member, and being pivotally connected to said first lever; and wherein said second operating means includes a first pivoted lever means; a slide movably mounted on said first lever means for movement along the same; a roller means mounted on said slide; a second pivoted lever means having a longitudinal edge engaged by said roller means, said second lever means supporting said second cam follower means; and a linkage connecting said first lever means with said supporting means for supporting said grinding tool.

References Cited in the file of this patent

UNITED STATES PATENTS

| | | |
|---|---|---|
| 1,179,556 | Pribnow | Apr. 18, 1916 |
| 2,675,717 | Standal | Apr. 20, 1954 |

FOREIGN PATENTS

| | | |
|---|---|---|
| 308,052 | Switzerland | Sept. 1, 1955 |